A. C. BUNKER.
LOCOMOTIVE TRUCK.
APPLICATION FILED FEB. 1, 1919.
1,307,616.
Patented June 24, 1919.
2 SHEETS—SHEET 1.
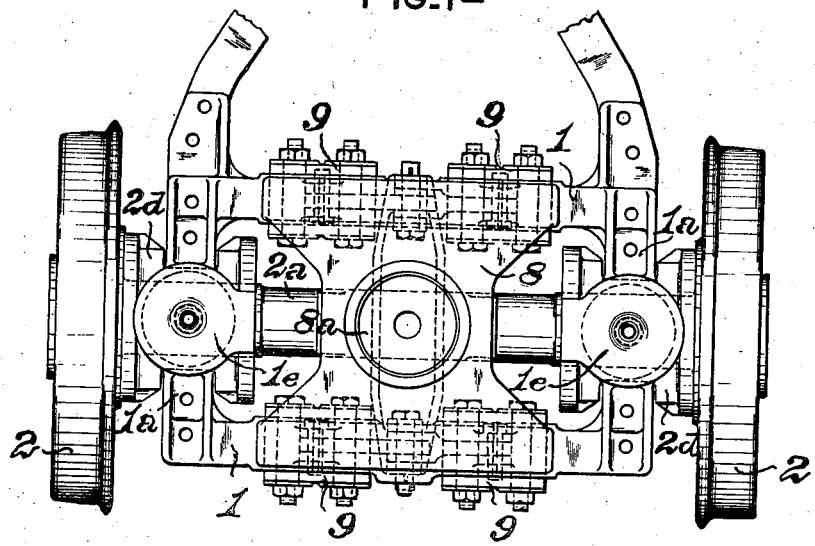
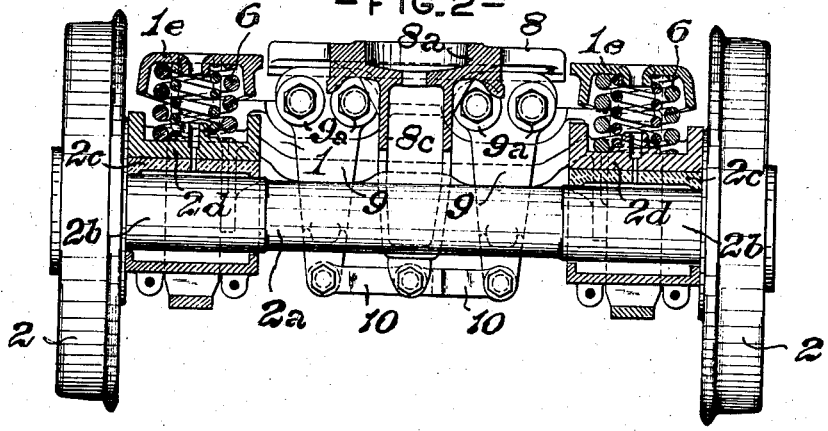
WITNESSES:
Edward H. Wright.
S. R. Bell.
INVENTOR
Arthur C. Bunker,
by Howden Bell
atty.

A. C. BUNKER.
LOCOMOTIVE TRUCK.
APPLICATION FILED FEB. 1, 1919.
1,307,616.
Patented June 24, 1919.
2 SHEETS—SHEET 2.
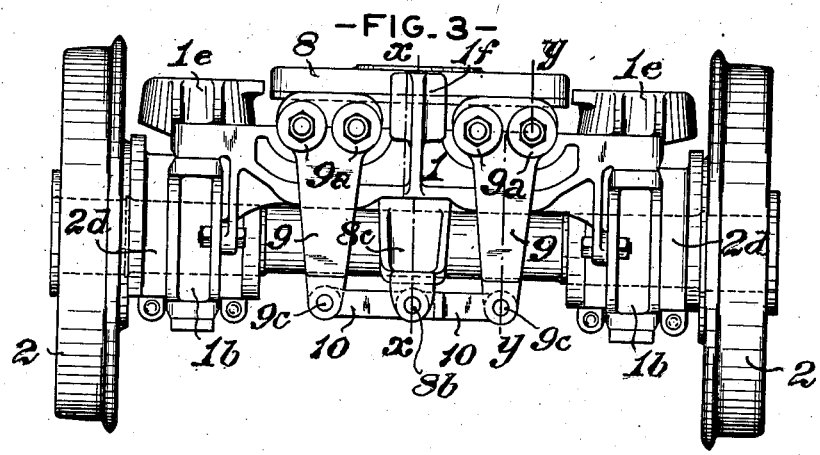
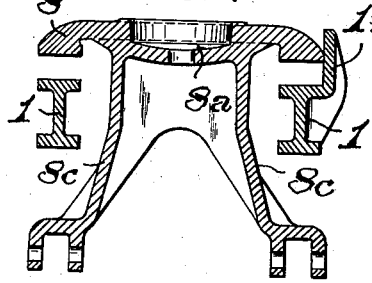
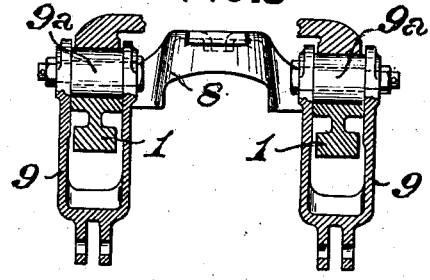
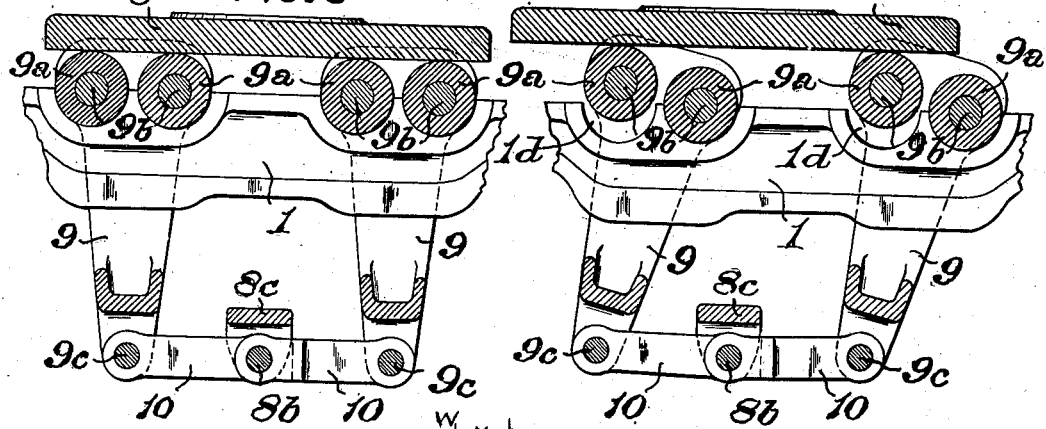

UNITED STATES PATENT OFFICE.

ARTHUR C. BUNKER, OF SCHENECTADY, NEW YORK.

LOCOMOTIVE-TRUCK.

1,307,616.  Specification of Letters Patent.  Patented June 24, 1919.

Application filed February 1, 1919. Serial No. 274,396.

*To all whom it may concern:*

Be it known that I, ARTHUR C. BUNKER, of Schenectady, in the county of Schenectady and State of New York, have invented a certain new and useful Improvement in Locomotive-Trucks, of which improvement the following is a specification.

My invention relates to leading or trailing trucks for locomotive engines, of the class or type known as "swing" or "lateral motion" trucks, and its object is to provide a truck of such type, which shall be of simple and substantial construction and readily applicable in locomotives of the present standard types, and in the operation of which, a substantially constant resistance to lateral motion shall be exerted.

The improvement claimed is hereinafter fully set forth.

In the accompanying drawings: Figure 1 is a plan or top view of a locomotive truck, illustrating an embodiment of my invention; Fig. 2, a vertical transverse section, taken on the plane of the axial line of the axle; Fig. 3, a front view, in elevation; Figs. 4 and 5, vertical transverse sections through the frame and bolster, on the lines $x$ $x$ and $y$ $y$, respectively, of Fig. 3; Fig. 6, a vertical section, in a plane parallel with the axle, through the bolster and a pair of swing links, when in normal or middle position; Fig. 7, a similar section, showing the bolster moved to the left; and, Fig. 8, a force diagram illustrating the action of the swing links.

In the practice of my invention, referring descriptively to the specific embodiment thereof which is herein exemplified, I provide a truck frame, which is an integral casting, of substantially rectangular form, comprising parallel front and rear members, 1, 1, extending transversely to the longitudinal central plane of the locomotive, and parallel side members, $1^a$, $1^a$, connecting the front and rear transverse members. A pair of pedestal jaws, $1^b$, is rigidly secured to each of the side members, $1^a$, and is braced by a lug extending downwardly therefrom.

The truck wheels, 2, are secured, in the usual manner, on the outer ends of the truck axle, $2^a$, the journals, $2^b$, of which, rotate in bearings, $2^c$, fitted in axle boxes, $2^d$, each of which is fitted between the members of one of the pairs of pedestal jaws. The truck frame is supported on the axle boxes through the intermediation of springs, 6, which are herein shown as of the helical type, and are interposed between the axle boxes and spring bearings, $1^e$, which are formed upon, or firmly secured to, the side members of the truck frame.

The capacity of lateral motion of the truck frame and its axle and wheels, relatively to the main frame of the locomotive, for the purpose of facilitating the passage of the locomotive to, through, and from curved portions of the track, is provided by a swing beam or bolster, 8, which extends transversely on the truck, above the front and rear members, 1, 1, of the frame, upon which members it is supported, its movement thereon, transversely to the locomotive, being controlled by an interposed system of swing links, which operate in the manner of lifting levers, and thrust links, the construction and manner of operation of which system will now be described.

The bolster, 8, on the top of which, at its center, is formed a socketed lower center casting, $8^a$, rests, normally, *i. e.*, when the locomotive is standing or running on a tangent of the track, upon eight cylindrical rollers, $9^a$, which are journaled in pairs, on pins, $9^b$, fixed in the upper ends of four swing links, 9. Said links are disposed on opposite sides of the longitudinal central planes of the locomotive and of the bolster, two of them being located on the forward, and two at the rear, side thereof, and are of substantially U section in longitudinal planes of the truck, and of gradually decreasing width from top to bottom in planes at a right angle thereto. When the bolster stands in the central or normal position above specified, each of the rollers, $9^a$, rests in a semicircular socket, $1^d$, in the frame member, 1, above which it is located. A pin, $9^c$, is fixed in the lower end of each of the swing links, 9, and the swing links of the pairs on each side (the forward and the rear) of the bolster, are coupled, by thrust links, 10, fitting on the pins, $9^c$, to pins, $8^b$, fitted in the lower ends of arms, $8^c$, which extend downwardly from opposite sides of the middle portion of the bolster.

In the operation of a truck constructed substantially as above described, when the locomotive is standing or running on a tangent of the track, the bolster, 8, occupies its middle or normal position, its lateral plane surfaces bearing on all the eight rollers, 9ᵃ, of the swing links, which rollers, in turn, bear on the semi-cylindrical sockets, 1ᵈ, of the truck frame. When, however, the locomotive moves from a tangent to a curve of the track, the bolster moves, in one or the other direction, relatively to the truck frame, as, say, to the left, as shown in Fig. 7. The lower ends of the swing links, 9, being, as before explained, coupled to the depending arms of the bolster, by the thrust links, 10, the swing links are, by such connection, coincidently swung in the same direction as the bolster, and the left hand rollers of the swing links are raised from their sockets on the truck frame, carrying with them the bolster. The plane surfaces of the bolster then rest on the four left hand rollers only, and the four right hand rollers remain in their sockets. Similarly, when the bolster moves to the right, the swing links are swung in the same direction, the left hand rollers remaining in their sockets, and the right hand rollers being raised therefrom. When the swing links are in inclined positions, in either direction, their operation is similar to that of bell crank levers, the load being applied to the then upper rollers, and the then lower rollers acting as fulcrums. This unbalanced position of the swing links effects a horizontal side thrust at their lower ends, which thrust is transmitted to the swing bolster through the thrust links. The resistance thereby opposed to the bolster is a nearly constant one, although increasing with, and being slightly greater at the end of, the swing of the links.

In passing around a curve, the swing bolster, of course, remains concentric with an axial line in the longitudinal central plane of the locomotive, and the truck frame, axle, and wheels swing away on an arc governed by the length of the radius bar. There results a longitudinal displacement of the bolster on the rollers of the swing links, which displacement is provided for by making the rollers of somewhat greater length than the width of the plane bearing surfaces of the bolster. A small degree of turning movement of the bolster is necessary, in order that it may be kept approximately parallel with the truck frame, to limit which turning movement a stop or guide, 1ᵗ, is formed centrally on the front of the truck frame.

It will be seen that, in the lateral movements of the truck, the swing links, 9, constitute, and operates as, bell crank levers, the thrust due to lateral displacement being imparted to each of them from the frame, through a short lever arm, the length of which is the distance between the axes of the two rollers, 9ᵃ, and being transmitted from the swing link to the swing bolster, through a long lever arm, the length of which is the vertical distance between the axis of the roller which rests in its frame socket and the axis of the thrust link pin, 9ᶜ.

This will be readily understood by reference to the diagram, Fig. 8, in which T indicates the thrust; A and B, the arms of the swing link when in normal central position; and X and Y, the vertical lengths of the arms referred to in a horizontal and a vertical plane respectively. The thrust, T, increases with the lateral displacement of the bolster, the rate of increase depending on the relative proportions of the arms, A and B. It can, however, be kept within such narrow limits as to render T practically constant; thus, by making A equal to 5 inches, and B equal to 15½ inches, the increase in T, with 6 inches lateral displacement of the bolster, is but 2 per cent. of the weight supported by the rollers, as compared with the initial resistance, which is given by the formula $$T_1 = \frac{WA}{B}.$$

I claim as my invention and desire to secure by Letters Patent:

1. In a lateral motion truck, the combination of a truck frame; a swing bolster; and an interposed system of swing links, each provided with three pivotal members, all of which are operative, simultaneously, in transmitting to the swing bolster, the side thrust due to its lateral displacement.

2. In a lateral motion truck, the combination of a truck frame; a swing bolster; and a plurality of interposed swing links, from each of which the vertical thrust due to lateral displacement is imparted, to the frame, through a short lever arm, and from each of which the horizontal thrust due to lateral displacement is transmitted to the swing bolster through a long lever arm.

3. In a lateral motion truck, the combination of a truck frame; a swing bolster; a plurality of interposed swing links; sockets in the truck frame, in which each of said swing links is normally journaled at two points, with freedom for automatic detachment from either socket; plane surfaces on the swing bolster, through which it bears on the swing links, at one or at two points, in accordance with their positions relatively to the frame sockets; and thrust links coupling the swing links to the swing bolster.

4. In a lateral motion truck, the combination of a truck frame; a swing bolster movable laterally thereon, and having plane bearing surfaces on its forward and rear sides, two pairs of open topped bearing sockets in each side of the frame, disposed on opposite sides of its longitudinal central plane; swing links, each journaled at top in two of said sockets and supporting the plane surfaces of the swing bolster; arms depending from the sides of the swing bolster, at the middle thereof; and thrust links, coupling the lower ends of the swing links to said arms.

5. In a lateral motion truck, the combination of a truck frame; a swing bolster; a plurality of interposed swing links; a pair of rollers journaled in the top of each of said links, on opposite sides of its longitudinal central plane; open topped sockets in the frame, in which said rollers are normally journaled; plane surfaces on the swing bolster, through which it bears on said rollers; and thrust links coupling the lower ends of the swing links to the swing bolster.

6. In a lateral motion truck, the combination of a truck frame; a swing bolster; a plurality of interposed swing links; sockets in the truck frame, in which each of said swing links is normally journaled at two points, with freedom for automatic detachment from either socket; plane surfaces on the swing bolster, through which it bears on the swing links, at one or at two points, in accordance with their positions relatively to the frame sockets; thrust links coupling the swing links to the swing bolster; and a stop, fixed on the truck frame, in position to limit the turning movement of the bolster.

ARTHUR C. BUNKER.

Witnesses:
  CHARLES WM. TODD,
  J. HOWARD WAGAR.